(12) United States Patent
Jin et al.

(10) Patent No.: US 11,268,019 B2
(45) Date of Patent: Mar. 8, 2022

(54) COLOR CONVERSION SHEET AND BACKLIGHT UNIT COMPRISING SAME

(71) Applicant: TORAY ADVANCED MATERIALS KOREA INC., Gumi-si (KR)

(72) Inventors: Sang Woo Jin, Gumi-si (KR); Jun Woo Park, Gumi-si (KR); Jin Woo Kwon, Gumi-si (KR); Ju Hee Choi, Gumi-si (KR); Ji Hoon Lee, Gumi-si (KR)

(73) Assignee: TORAY ADVANCED MATERIALS KOREA INC., Gumi-si (KR)

(*) Notice: Subject to any disclaimer, the term of this patent is extended or adjusted under 35 U.S.C. 154(b) by 0 days.

(21) Appl. No.: 17/264,468

(22) PCT Filed: Oct. 17, 2018

(86) PCT No.: PCT/KR2018/012266
§ 371 (c)(1),
(2) Date: Jan. 29, 2021

(87) PCT Pub. No.: WO2020/027375
PCT Pub. Date: Feb. 6, 2020

(65) Prior Publication Data
US 2021/0317363 A1    Oct. 14, 2021

(30) Foreign Application Priority Data

Jul. 31, 2018    (KR) .................. 10-2018-0089266

(51) Int. Cl.
*C09K 11/02*    (2006.01)
*C09J 7/38*    (2018.01)
(Continued)

(52) U.S. Cl.
CPC ............. *C09K 11/02* (2013.01); *C09J 7/38* (2018.01); *C09K 11/06* (2013.01); *G02B 6/005* (2013.01);
(Continued)

(58) Field of Classification Search
CPC .. C09K 11/02; C09K 11/025; G02F 1/133614
(Continued)

(56) References Cited

U.S. PATENT DOCUMENTS

2016/0230960 A1    8/2016    Seo et al.
2017/0373229 A1    12/2017    Shin et al.

FOREIGN PATENT DOCUMENTS

| CN | 110546228 A | * 12/2019 | ............. B33Y 10/00 |
| JP | 10-260406 A | 9/1998 | |

(Continued)

OTHER PUBLICATIONS

International Search Report dated Apr. 30, 2019 in counterpart International Patent Application No. PCT/KR2018/012266 (2 pages in English and 2 pages in Korean).
(Continued)

*Primary Examiner* — Christopher M Raabe
(74) *Attorney, Agent, or Firm* — NSIP Law (57) ABSTRACT

The present invention provides a color conversion sheet comprising: a first wavelength conversion layer in which an organic phosphor is dispersed in a resin matrix; and an adhesive layer disposed on one surface of the first wavelength conversion layer, in which a surface energy of the first wavelength conversion layer is different from a surface energy of the adhesive layer so that the organic phosphor does not diffuse into the adhesive layer.

16 Claims, 3 Drawing Sheets

(51) Int. Cl.
*G02F 1/1335* (2006.01)
*C09K 11/06* (2006.01)
*F21V 8/00* (2006.01)

(52) U.S. Cl.
CPC ... *G02F 1/133614* (2021.01); *C09J 2203/326* (2013.01); *C09J 2433/008* (2013.01); *C09J 2467/008* (2013.01); *C09J 2483/00* (2013.01); *C09K 2211/1007* (2013.01); *C09K 2211/1018* (2013.01)

(58) Field of Classification Search
USPC .......................................................... 362/84
See application file for complete search history.

(56) References Cited

FOREIGN PATENT DOCUMENTS

| | | |
|---|---|---|
| JP | 2016-141741 A | 8/2016 |
| JP | 2017-88876 A | 5/2017 |
| KR | 10-2014-0007840 A | 1/2014 |
| KR | 10-2016-0094885 A | 8/2016 |
| KR | 10-2016-0094887 A | 8/2016 |
| KR | 10-2016-0097144 A | 8/2016 |
| KR | 10-2016-0097153 A | 8/2016 |
| KR | 10-2017-0119200 A | 10/2017 |

OTHER PUBLICATIONS

Written Opinion dated Apr. 30, 2019 in counterpart International Patent Application No. PCT/KR2018/012266 (4 pages in Korean).

* cited by examiner

COLOR CONVERSION SHEET AND BACKLIGHT UNIT COMPRISING SAME

CROSS REFERENCE TO RELATED APPLICATIONS

This application is a U.S. National Stage Application of International Application No. PCT/KR2018/012266, filed on Oct. 17, 2018, which claims the benefit under 35 USC 119(a) and 365(b) of Korean Patent Application No. 10-2018-0089266, filed on Jul. 31, 2018, in the Korean Intellectual Property Office, the entire disclosure of which is incorporated herein by reference for all purposes.

TECHNICAL FIELD

The present invention relates to a color conversion sheet using an organic phosphor and a backlight unit including the same.

BACKGROUND ART

Liquid crystal display (LCD) devices are non-emissive type devices that do not form an image by itself but must receive light incident from the outside to form an image, and thus the LCD devices require a backlight unit (BLU) for emitting light on the back surface thereof.

Recently, quantum dot technology has been used to realize high-definition of LCD devices. This quantum dot technology may implement various colors only by adjusting the size of nano-inorganic particles, and has excellent stability against light, such as ultraviolet (UV) rays.

However, conventional cadmium (Cd)-based nano-inorganic particles become an environmental concern, and must be used together with a barrier film due to its vulnerability to moisture, and thus price competitiveness is low.

Therefore, in recent years, various types of organic phosphors having high color gamut and excellent luminance characteristics without including cadmium-based nano-inorganic particles have been widely developed. However, when organic phosphors come into contact with external oxygen and moisture, they react with oxygen and moisture and deteriorate, resulting in lower photo-durability, and there is an urgent need to develop a technology to solve this problem.

Technical Problem

The present invention is conceived to solve the aforementioned problems in the prior art. Thus, an object of the present invention is to provide a color conversion sheet which has excellent color gamut and luminance characteristics while employing an environmentally safe organic phosphor by protecting the organic phosphor contained in a wavelength conversion layer from external oxygen and moisture, as well as preventing the organic phosphor from diffusing into an adjacent layer, and exhibits low color change and excellent luminance reliability upon irradiation of light at room temperature and even in an environment of high temperature or high temperature and high humidity, and a backlight unit including the same.

The aforementioned and other objects and advantages of the invention will become apparent to those skilled in the art from reading the following description illustrating preferred embodiments of the invention.

Technical Solution

The above object may be achieved by a color conversion sheet including a first wavelength conversion layer in which an organic phosphor is dispersed in a resin matrix; and an adhesive layer disposed on one surface of the first wavelength conversion layer, in which a surface energy of the first wavelength conversion layer is different from a surface energy of the adhesive layer so that the organic phosphor does not diffuse into the adhesive layer.

Preferably, the color conversion sheet may further include a base film on at least one surface of the first wavelength conversion layer or the adhesive layer.

Preferably, a difference between the surface energy of the first wavelength conversion layer and the surface energy of the adhesive layer may exceed 5 mN/m.

Preferably, in the first wavelength conversion layer, organic phosphors of the same color or two or more different colors may be dispersed in the resin matrix.

Preferably, the resin matrix may contain at least one of an ester-based resin, an olefin-based resin, an acrylic-based resin, an ether-based resin, an urethane-based resin, a carbonate-based resin, or an imide-based resin.

Preferably, a resin contained in the resin matrix may have a number average molecular weight (Mn) of 1,000 to 50,000 g/mol or a weight average molecular weight (Mw) of 50,000 to 2,000,000 g/mol.

Preferably, the resin matrix may have a glass transition temperature of 0° C. to 120° C.

Preferably, the adhesive layer may contain a resin having a hydrophobic functional group.

Preferably, the adhesive layer may contain a resin, such as a thermoplastic resin, a thermosetting resin, or a UV curable resin and a hydrophobic additive, having a visible light transmittance of 70% or more.

Preferably, the adhesive layer may contain a resin having a hydrophobic functional group, and a hydrophobic additive.

Preferably, the resin having a hydrophobic functional group or the hydrophobic additive may contain at least one of single molecules, oligomers, or resins, including a silicon or fluorine element.

Preferably, an adhesion strength of the adhesive layer to the first wavelength conversion layer or the base film may be 50 gf/inch or more.

Preferably, the organic phosphor may be contained in an amount of 0.0001 to 10 parts by weight based on 100 parts by weight of resin solid content of the resin matrix.

Preferably, the color conversion sheet may further include a second wavelength conversion layer formed on one surface of the adhesive layer on which the first wavelength conversion layer is not positioned.

Preferably, the second wavelength conversion layer may contain an organic phosphor of the same or different color from that of the organic phosphor contained in the first wavelength conversion layer.

The above object may be achieved by a backlight unit including the color conversion sheet described above.

Advantageous Effects

As described above, according to the color conversion sheet according to an aspect of the present invention and a backlight unit including the same, the color conversion sheet is further provided with an adhesive layer for preventing diffusion of an organic phosphor, formed on one surface of the wavelength conversion layer in which the organic phosphor is dispersed, so that the problems, such as color coordinate change or degradation in reliability, which may occur when the wavelength conversion layer is exposed to the outside and thus the organic phosphor is deteriorated by unnecessary elements, such as moisture and oxygen in the air, may be solved.

In addition, according to an embodiment of the present invention, it is possible to solve problems of change in luminance characteristics and color change by preventing organic phosphors in the wavelength conversion layer from diffusing into the adhesive layer under the condition of high temperature, or high temperature and high humidity.

In addition, according to an embodiment of the present invention, it is possible to combine with an optical substrate, such as a light guide plate, a prism sheet, and a double brightness enhancement film (DBEF), as well as to apply various organic phosphors and various resin matrices, and to omit a barrier film, so that price competitiveness is excellent.

It will be appreciated by persons skilled in the art that the effects that can be achieved through the present invention are not limited to what has been particularly described hereinabove and other advantages of the present invention will be more clearly understood from the following detailed description.

MODE FOR INVENTION

Hereinafter, embodiments of the present invention will be described in detail with reference to the accompanying drawings so as to be easily practiced by a person of ordinary skill in the art. It should be understood that the present invention is not to be construed as limited to the embodiments set forth herein and may be embodied in many different forms.

In the drawings, the thickness of layers and regions are exaggerated for clarity. Like reference numerals designate like elements throughout the specification. It will be understood that when an element such as a layer, film, region or substrate is referred to as being "on" another element, it can be directly on the other element or intervening elements may also be present. In contrast, when an element is referred to as being "directly on" another element, there are no intervening elements present.

Unless otherwise defined, all technical and scientific terms used herein have the same meaning as commonly understood by one of ordinary skill in the art to which this invention belongs. In case of conflict, the specification, including definitions, will control. In addition, although methods and materials similar or equivalent to those described herein can be used in the practice or testing of the invention, suitable methods and materials are described herein.

Hereinafter, a color conversion sheet according to the present invention will be described in detail with reference to the drawings.

Figure 1:
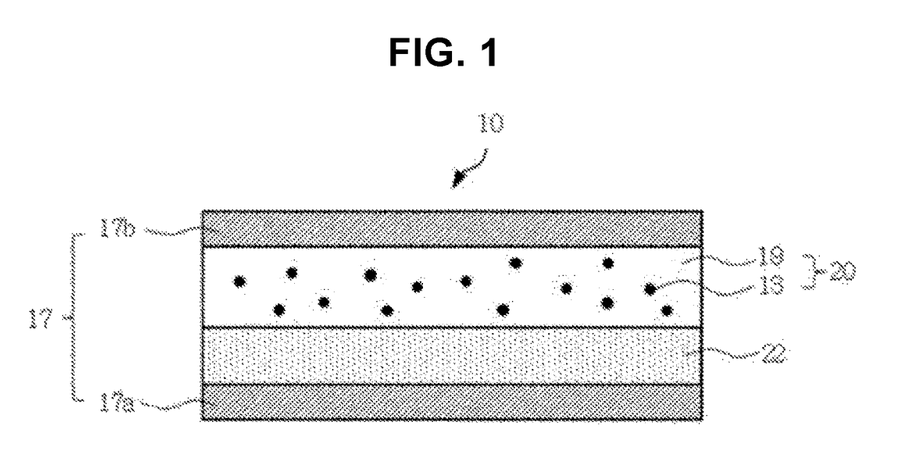
FIG. 1 is a cross-sectional view of a color conversion sheet according to an aspect of the present invention.

FIG. 1 is a cross-sectional view of a color conversion sheet according to an aspect of the present invention.

Referring to FIG. 1, the color conversion sheet 10 according to an aspect of the present invention includes a wavelength conversion layer 20 formed by dispersing an organic phosphor 13 in a resin matrix 19 and an adhesive layer 22 formed on one surface of the wavelength conversion layer 20, and is characterized in that the organic phosphor 13 is prevented from diffusing into the adhesive layer 22.

In addition, a base layer 17 may be further included as necessary on at least one surface of the wavelength conversion layer 20 or the adhesive layer 12 in contact with the outside. That is, the base layer 17 may be further included on one surface of the wavelength conversion layer on which the adhesive layer 22 is not formed and/or on one surface of the adhesive layer 22 on which the wavelength conversion layer 20 is not formed.

In one embodiment, the wavelength conversion layer 20 includes the organic phosphor 13 dispersed in the resin matrix 19.

In one embodiment, the resin matrix 19 may contain at least one of an ester-based resin, an olefin-based resin, an acrylic-based resin, an ether-based resin, an urethane-based resin, a carbonate-based resin, or an imide-based resin, and serves to prevent decomposition of the organic phosphor 13 dispersed in the resin matrix 19 by fixing the organic phosphor 13 and preventing exposure to moisture or oxygen.

In addition, the resin contained in the resin matrix 19 may have a number average molecular weight (Mn) of 1,000 to 50,000 g/mol or a weight average molecular weight (Mw) of 50,000 to 2,000,000 g/mol.

When the number average molecular weight of the resin contained in the resin matrix 19 is less than 1,000 g/mol or the weight average molecular weight is less than 50,000 g/mol, it is difficult to fix the organic phosphor 13, so that temperature-induced aggregation of the organic phosphor 13 may occur, leading to deterioration in optical properties, and when the number average molecular weight exceeds 50,000 g/mol or the weight average molecular weight exceeds 2,000,000 g/mol, the resin matrix 19 has poor solubility in the solvent, which may make it difficult to form the wavelength conversion layer 20.

In addition, the acid value of the resin contained in the resin matrix 19 may be 0 to 15 mgKOH/g, preferably 0 to 10 mgKOH/g, and the hydroxyl value may be 0 to 30 mgKOH/g, preferably 0 to 20 mgKOH/g, and more preferably 0 to 10 mgKOH/g.

In general, ester-based resins, olefin-based resins, acrylic-based resins, ether-based resins, urethane-based resins, carbonate-based resins, and imide-based resins can be applied as a resin matrix for a wavelength conversion layer included in a color conversion sheet, and functional groups, such as hydroxyl groups or carboxylic acid groups, present in these resins accelerate the deterioration of an organic phosphor dispersed in the resin matrix, which may reduce the reliability of the organic phosphor. Therefore, it is preferable to keep the acid value and hydroxyl value in the aforementioned range.

An ester-based resin, which is one of the resins that can be used as the resin matrix 19, may contain an aliphatic polyhydric alcohol and an ester-based resin polymerized from an aliphatic or aromatic polyhydric acid.

Here, the aliphatic polyhydric alcohol is an aliphatic compound having 2 or more hydroxyl groups and 2 to 10 carbon atoms, and may include, for example, at least one of ethylene glycol, propane diol, butane diol, neopentyl glycol, or trimethylolpropane.

The aliphatic polyhydric acid is an aliphatic compound having 2 or more carboxylic acid groups and 2 to 12 carbon atoms, and may include, for example, at least one of malonic acid, succinic acid, adipic acid, or sebacic acid, and the aromatic polyhydric acid is an aromatic compound having 2 or more carboxylic acid groups and 1 to 4 aromatic rings, and may include, for example, at least one of isophthalic acid, phthalic acid, terephthalic acid, or cyclohexyl dicarboxylic acid.

The resin of the resin matrix 19 may include at least one of polyester, modified polyester, polyethylene, polycycloolefin, poly(methyl) methacrylate, polyethylene glycol, polyurethane, polycarbonate, or polyimide, and may include block copolymers thereof.

In addition, the resin matrix 19 may have a glass transition temperature (Tg) of 0° C. to 120° C., preferably 20° C. to 120° C., and more preferably 60° C. to 120° C.

When the glass transition temperature of the resin matrix 19 is less than 0° C., temperature-induced aggregation of the plurality of organic phosphors 13 may occur, leading to deterioration in optical characteristics, and when the glass transition temperature exceeds 120° C., the resin may have poor solubility in a solvent due to high crystallinity of the resin in general, and curling of a base film may occur due to crystallization of the resin when drying after coating the base film with the resin.

In one embodiment, the organic phosphor 13 dispersed in the resin matrix 19 of the wavelength conversion layer 20 is a phosphor that, upon irradiation of exciting light, emits light having a wavelength different from that of the exciting light. The wavelength conversion layer 20 may emit light of various colors through a green phosphor, a red phosphor, or a combination thereof depending on the purpose.

A plurality of organic phosphors 13 of the same color emitting one color may be included in one wavelength conversion layer 20, wherein the plurality of organic phosphors are the same material or different materials.

For example, the wavelength conversion layer 20 may include only one organic phosphor from among a plurality of green organic phosphors or a plurality of red organic phosphors to emit only one color of light, and when an organic phosphor of one color is used in one wavelength conversion layer, two or more wavelength conversion layers 20 each including an organic phosphor of a different color may be separately provided to emit light of various colors.

In another embodiment, a mixture of a plurality of organic phosphors 13 of two or more different colors may be included in one wavelength conversion layer 20, wherein the plurality of organic phosphors 13 may be the same material or different materials. For example, the wavelength conversion layer 20 may include a mixture of a green organic phosphor and a red organic phosphor.

The organic phosphor 13 may include compounds having a condensed aryl ring, such as naphthalene, anthracene, phenanthrene, pyrene, chrysene, triphenylene, perylene, fluoranthene, fluorene, indene, etc., derivatives thereof (e.g., 2-(benzothiazol-2-yl)-9,10-diphenylanthracene 5,6,11,12-tetraphenylnaphthacene, etc.), compounds having a heteroaryl ring and derivatives thereof, such as furan, pyrrole, thiophene, silol, 9-silafluorene, 9,9'-spirobisilafluorene, benzothiophene, benzofuran, indole, dibenzothiophene, dibenzofuran, imidazopyridine, phenanthroline, pyridine, pyrazine, naphthyridine, quinoxaline, pyrrolopyridine, thioxanthene, etc., borane derivatives, distyrylbenzene derivatives, aminostyryl derivatives, such as 4,4'-bis(2-(4-diphenylaminophenyl)ethenyl)biphenyl, 4,4'-bis(N-(stilben-4-yl)-N-phenylamino)stilbene, etc., aromatic acetylene derivatives, tetraphenyl butadiene derivatives, stilbene derivatives, aldazine derivatives, pyromethene derivatives, coumarin derivatives, such as diketopyrrolo[3,4-c]pyrrole derivatives, 2,3,5,6-1H,4H-tetrahydro-9-(2'-benzothiazolyl) quinolizino[9,9a,1-gh]coumarin, etc., azole derivatives and metal complexes thereof, such as imidazole, thiazole, thiadiazole, carbazole, oxazole, oxadiazole, triazole, etc., and aromatic amine derivatives represented by N,N'-diphenyl-N,N'-di(3-methylphenyl)-4,4'-diphenyl-1,1'-diamine.

As the organic phosphor 13 according to one embodiment of the present invention, the green organic phosphor may include a compound represented by Formula 1 below, and the red organic phosphor may include a compound represented by Formula 2 below.

[Formula 1]

[Formula 2]

The organic phosphor 13 may be contained in an amount of 0.0001 to 10 parts by weight based on 100 parts by weight of the resin solid content of the resin matrix. When the organic phosphor 13 is contained in an amount of less than 0.0001 parts by weight, color conversion to a desired color through the color conversion sheet 10 may be insufficient, and when its amount exceeds 10 parts by weight, quenching may occur due to interactions, such as aggregation of the organic phosphor 13.

The thickness of the wavelength conversion layer 20 including the organic phosphor 13 dispersed in the resin matrix 19 may be 1 to 150 μm, preferably 1 to 100 μm, and more preferably 1 to 50 μm.

When the thickness of the wavelength conversion layer 20 exceeds 150 μm, it is difficult to sufficiently remove solvents, so that the organic phosphor 13 may be deteriorated by various solvents remaining in the wavelength conversion layer 20.

In one embodiment, the adhesive layer 22 formed on one surface of the wavelength conversion layer 20 prevents the wavelength conversion layer 20 from being exposed to the outside, thereby preventing problems, such as a color coordination change or degradation of reliability due to deterioration of the organic phosphor inside or on the surface of the wavelength conversion layer by unnecessary elements, such as moisture or oxygen in the air.

The adhesive layer 22 is formed on one surface of the wavelength conversion layer 20 and impedes the organic phosphor 13 of the wavelength conversion layer 20 from diffusing into the adhesive layer 22 even in various environments of high temperature or high temperature and high humidity, thereby preventing problems, such as color coordinate change or degradation of reliability, due to diffusion of the organic phosphor 13 to the adhesive layer 22 or other layers through the adhesive layer 22.

In addition, the adhesive layer 22 prevents interlayer mixing at the interfaces formed on one side thereof with the wavelength conversion layer 20, thereby preventing problems, such as color coordinate change or degradation of reliability, due to movement of the organic phosphor 13 from the interface of the wavelength conversion layer 20 to the adhesive layer 22.

That is, in the case of a general adhesive layer, organic phosphors of a wavelength conversion layer diffuse or move to the adhesive layer over time in an environment of high temperature of high temperature and high humidity, and the resulting change in distance between the organic phosphors may change luminous efficiency of the organic phosphors, and ultimately cause color coordinate change or degradation of reliability of light emitted by a color conversion sheet. However, in the color conversion sheet 10 according to the present invention, the adhesive layer 22 impedes the diffusion of the organic phosphors 13 of the wavelength conversion layer 20 and the movement due to interlayer mixing, so that the distance between the organic phosphors 13 is maintained constant and accordingly such problems can be prevented, which makes it possible to realize high color uniformity, uniform luminance, and high reliability even in various environments.

Accordingly, the adhesive layer 22, which may be a transparent and flexible polymer layer, may be a thermoplastic resin, a thermosetting resin, a UV curable resin, or the like having a visible light transmittance of 70% or more, but is not limited thereto. Any polymer material is applicable, as long as it can impede the diffusion of the organic phosphor 13 of the wavelength conversion layer 20 or prevent mixing with the resin matrix 19.

In one embodiment, in the color conversion sheet 10 according to the present invention, the wavelength conversion layer 20 and the adhesive layer 22 have different surface energy from each other. More specifically, the adhesive layer 22 has a lower surface energy than the wavelength conversion layer 20. By doing so, the difference in surface energy may prevent mixing of the adhesive layer 22 and the wavelength conversion layer 20, thereby preventing the occurrence of problems, such as color coordinate change or degradation of reliability, due to the increased distance between the organic phosphor 13 upon mixing.

In addition, as the adhesive layer 22 has a lower surface energy than the wavelength conversion layer 20, the organic phosphor 13 of the wavelength conversion layer 20 can be prevented from being diffused into the adhesive layer 20, and diffusion of moisture and oxygen from the outside is also reduced, so that deterioration of the organic phosphor 13 can be prevented.

Thus, the adhesive layer 22 may have at least 0.1% of the surface area as a low surface energy region in which the surface energy is lower than that of the wavelength conversion layer 20.

More specifically, the surface energy between the adhesive layer 22 and the wavelength conversion layer 20 satisfies Equation 1 below. That is, any polymer material satisfying Equation 1 is applicable to the adhesive layer 22 and the wavelength conversion layer 20.

$$E2-E1>5 \text{ mN/m} \quad [\text{Equation 1}]$$

E1: Surface energy of adhesive layer (mN/m)

E2: Surface energy of wavelength conversion layer (mN/m)

The difference in surface energy between the adhesive layer 22 and the wavelength conversion layer 20 may exceed 5 mN/m as shown in Equation 1, preferably 7 mN/m or more, and more preferably 10 mN/m or more. When the difference in surface energy between the adhesive layer 22 and the wavelength conversion layer 20 is not sufficient, the effect of preventing the diffusion of the organic phosphor 13 may be insufficient.

In this case, the surface energy of the wavelength conversion layer 20 may be surface energy of a component including both the resin matrix 19 and the organic phosphor 13. The surface energy of the wavelength conversion layer 20 may be determined by the interaction between the resin matrix 19 and the organic phosphor 13. When the organic phosphor 13 is contained in a small amount (e.g., 0.0001 parts by weight) in the resin matrix 19, the surface energy of the wavelength conversion layer 20 may be close to the surface energy of the resin matrix 19, and when the organic phosphor 13 is contained in a relatively large amount (e.g., 10 parts by weight) in the resin matrix 19, the surface energy of the wavelength conversion layer 20 may be changed by the mixture of the resin matrix 19 and the organic phosphor 13.

In one embodiment, the adhesive layer 22 may contain a resin having a hydrophobic functional group, or contain a mixture of a hydrophobic additive with a resin having no hydrophobic function group, in order to have low surface energy.

The adhesive layer 22 does not contain a separate hydrophobic additive, and the adhesive layer 22 may be directly formed of a resin having a hydrophobic functional group. That is, the adhesive layer 22 is not mixed with a separate hydrophobic additive, and is formed of a resin alone having a hydrophobic functional group, so that the adhesive layer 22 has a lower surface energy than the wavelength conversion layer 20. In this case, in the adhesive layer 22, the resin having a hydrophobic functional group may be at least one of single molecules, oligomers, or resins, including a silicon or fluorine element.

In addition, the adhesive layer 22 may contain a hydrophobic additive to lower the surface energy of the resin. The hydrophobic additive may be at least one of single molecules, oligomers, or resins, including a silicon or fluorine element.

In this case, the adhesive layer 22 may contain 0.1 to 50 parts by weight of a hydrophobic additive based on 100 parts by weight of a resin, such as a thermoplastic resin, a thermosetting resin, or a UV curable resin, having a visible light transmittance of 70% or more, and preferably contain 0.1 to 30 parts by weight. In this way, the adhesive layer 22 may be configured to have a lower surface energy than the wavelength conversion layer 20 by adding a hydrophobic additive thereto.

In addition, it is apparent that a mixture of a hydrophobic resin having a hydrophobic functional group and a hydrophobic additive may be used in the adhesive layer 22.

In addition, the adhesive layer 22 may further include a crosslinking agent for chemical cross-linking of the resin, if necessary. For example, an isocyanate-based crosslinking agent, an amine-based crosslinking agent, an anhydridebased crosslinking agent, a thiol-based crosslinking agent, an epoxy-based crosslinking agent, a siloxane-based crosslinking agents, and the like may be used, but the crosslinking agent is not limited thereto, and various crosslinking agents may be applied as necessary.

In addition, the adhesive layer 22 may further include a catalyst to improve the chemical crosslinking of the resin, if necessary. For example, a noble metal catalyst, such as platinum or rhodium, may be used, but the catalyst is limited thereto, and various catalysts may be applied as necessary.

Accordingly, the adhesive layer 22 may be a resin, such as a thermoplastic resin, a thermosetting resin, or a UV curable resin, having a visible light transmittance of 70% or more and containing at least a hydrophobic functional group or a hydrophobic additive.

The adhesive layer 22 may be formed in a thickness range of 0.1 to 100 μm, preferably 0.1 to 50 μm, and more preferably 0.1 to 30 μm.

When the thickness of the adhesive layer 22 is less than 0.1 μm, the diffusion preventive function for the organic phosphor 13 lowers, which makes it difficult to control color change that may occur due to the diffusion of the organic phosphor 13, and which may also cause a decrease in adhesion with the wavelength conversion layer 20. On the other hand, when the thickness of the adhesive layer 22 exceeds 100 μm, transmission efficiency of light may be impaired and the organic phosphor 13 may be deteriorated by various solvents remaining in the adhesive layer 22.

The adhesive layer 22 may further contain, if necessary, an inorganic oxide for the purpose of light diffusion, and the inorganic oxide may be selected from silica, alumina, titania, zirconia, and combinations thereof. These inorganic oxides can act as light diffusing materials.

The adhesive layer 22 may have a refractive index different from that of the wavelength conversion layer 20. For example, in the case where incident light finally exits through the wavelength conversion layer 20, the refractive index of the adhesive layer 22 may be greater than that of the wavelength conversion layer 20. The light reflectivity of the adhesive layer 22 may be increased so that the light whose color has been finally converted can be effectively emitted to outside.

In one embodiment, the base film 17 may be positioned on at least one surface of the wavelength conversion layer 20 or the adhesive layer 22 as necessary.

The base film 17 may be a transparent and flexible polymer film. For example, the base film 17 may be a polyethylene terephthalate (PET), polyethylene naphtalate, polyacrylate, polycarbonate, polyetherimide, or polyimide polymer film, but is not limited thereto, and various polymer films may be applied.

Here, the base film 17 may be a diffusion sheet, a prism sheet, or the like, but is not limited thereto, and a sheet having various functions may be applied.

In the case where the base film 17 is laminated on one surface of the adhesive layer 22, the adhesion strength of the adhesive layer 22 to the base film 17 and the adhesion strength of the adhesive layer 22 to the wavelength conversion layer 20 may be 50 gf/inch or more.

When the adhesive strength is less than 50 gf/inch, it may be difficult to fix the laminated structure of the color conversion sheet 10.

Next, a color conversion sheet according to another aspect of the present invention will be described with reference to FIG. 2.

Figure 2:
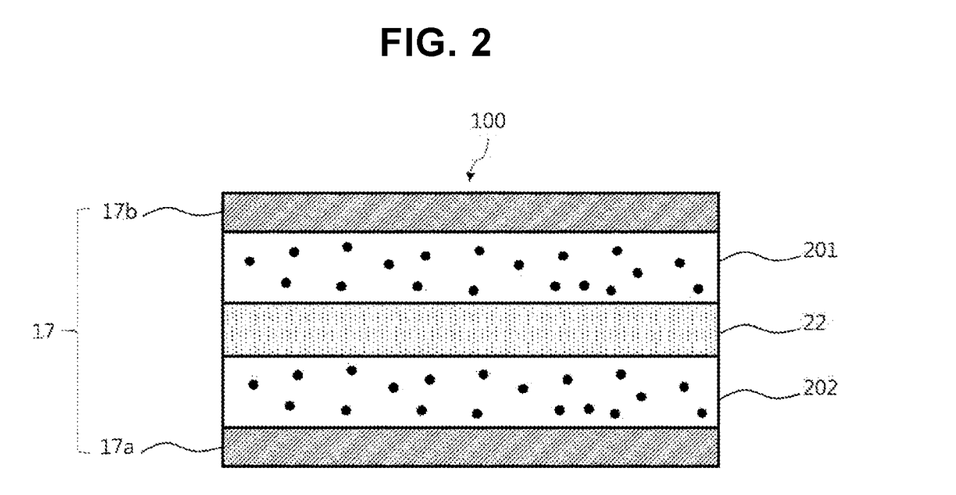
FIG. 2 is a cross-sectional view of a color conversion sheet according to another aspect of the present invention.

FIG. 2 is a cross-sectional view of a color conversion sheet according to another aspect of the present invention.

In the color conversion sheet 100 according to another aspect of the present invention shown in FIG. 2, a first wavelength conversion layer 201 may be formed on an upper surface of an adhesive layer 22, a second wavelength conversion layer 202 may be formed on a lower surface of the adhesive layer 22, and a base film 17 may be formed on outer surfaces of the first wavelength conversion layer 201 and the second wavelength conversion layer 202, as necessary.

Hereinafter, descriptions redundant with those provided with reference to FIG. 1 which illustrates the color conversion sheet 10 according to one aspect of the present invention will be omitted.

The first wavelength conversion layer 201 and the second wavelength conversion layer 202 may each contain an organic phosphor 13 having a different color from each other. When a mixture of organic phosphors of different colors is used in one wavelength conversion layer, deterioration may occur due to a reaction between different organic phosphors, or a change in color coordinates may occur due to a change in distance between different organic phosphors.

Thus, the organic phosphors of different colors may be separated into the individual wavelength conversion layers 201 and 202 to prepare the color conversion sheet 100. For example, the color conversion sheet 100 may be prepared by mixing a green organic phosphor into the first wavelength conversion layer 201 and mixing a red organic phosphor into the second wavelength conversion layer 202.

The adhesive layer 22 has a lower surface energy than the first wavelength conversion layer 201 and the second wavelength conversion layer 202 so that the organic phosphor is prevented from being diffused into or being diffused and mixed with the adhesive layer 22. In this case, it is preferable that the adhesive layer satisfies Equation 1 above for both the first wavelength conversion layer 201 and the second wavelength conversion layer 202.

Next, a backlight unit including a color conversion sheet according to another aspect of the present invention will be described with reference to FIG. 3.

Figure 3:
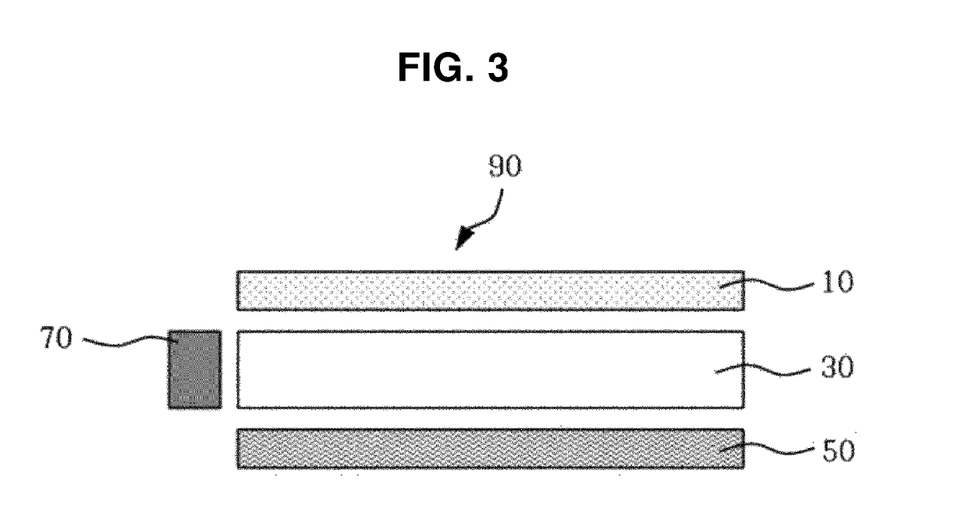
FIG. 3 is a schematic diagram of a backlight unit including a color conversion sheet according to another aspect of the present invention.

FIG. 3 is a schematic diagram of a backlight unit including a color conversion sheet according to another aspect of the present invention.

The backlight unit 90 according to another aspect of the present invention may include a light source 70, a reflective plate 50 which can increase light efficiency by reflecting light emitted from the light source 70, a light guide plate 30 which is located above the reflective plate 50 and serves to evenly spread the light emitted from the light source 70, and a color conversion sheet 10 positioned above the light guide plate 30.

Although the edge-type light source 70 is illustrated in FIG. 3 for convenience, the light source 70 it is not limited thereto, and the light source 70 may be applied in various types, such as a side chain type or a direct-lit type.

In addition, the same color conversion sheet as described in the embodiment shown in FIG. 1 or 2 may be used as the color conversion sheet 10, and thus a redundant description of the color conversion sheet 10 will be omitted.

In addition, at least one optical sheet, for example, a diffusion sheet, a prism sheet, and a double brightness enhancement film (DBEF) may be further provided on an upper portion of the color conversion sheet 10.

Hereinafter, the configuration of the present invention and effects thereof will be described in more detail through Examples and Comparative Examples. The following examples are provided to illustrate further the present invention and are not intended to limit the scope of the present invention.

EXAMPLES

Example 1

Two organic phosphor solutions were prepared by dissolving a green organic phosphor and a red organic phosphor according to the following Formulas 1 and 2 in methyl ethyl ketone, respectively.

[Formula 1]

[Formula 2]

Two prepared organic phosphor solutions were mixed with a polyester resin in which a polyester chip (SK Chemicals, Es-120) having an acid value of 3 mgKOH/g and a hydroxyl value of 2 to 6 mgKOH/g was dissolved in methyl ethyl ketone. Thereafter, methyl ethyl ketone was added to the mixture so that the viscosity became 150 cps, and then the mixture was stirred at 150 rpm for 30 minutes to prepare a wavelength conversion layer composition. At this time, the green organic phosphor was set to be 0.75 parts by weight based on 100 parts by weight of the solid content of the polyester resin, and the red organic phosphor was set to 0.015 parts by weight based on 100 parts by weight of the solid content of the polyester resin.

The wavelength conversion layer composition was bar-coated onto the opposite surface of a diffusion layer of a diffusion film (TAK, TDF12C) and dried at 120° C. for 2 minutes to prepare a wavelength conversion layer having a thickness of 20 μm.

Next, 50 parts by weight of toluene was added to 100 parts by weight of a silicon-based resin (DOW, DC7663), followed by stirring for 2 hours. Thereafter, 0.5 parts by weight of a platinum catalyst (DOW, SYL-OFF 4000 CATALYST) was added and stirred for an additional 30 minutes to prepare an adhesive layer composition.

The adhesive layer composition prepared as above was bar-coated onto an upper surface of a polyethylene terephthalate (PET) film (TAK, PL8) and then dried at 120° C. for 2 minutes to prepare an adhesive layer having a thickness of 10 μm.

After laminating the wavelength conversion layer and the adhesive layer prepared as described above to be in contact with each other, a color conversion sheet was prepared using a roll laminator (GMP, EXCELAM II-355Q).

Example 2

A color conversion sheet was prepared in the same manner as in Example 1, except that a resin prepared by adding 20 parts by weight of toluene to 100 parts by weight of an acrylic-based resin (Samwon Co., Ltd, AT-2100) instead of the silicon-based resin of the adhesive layer composition and adding 2 parts by weight of a silicon-based additive (BYK, BYK-325N) was used.

Example 3

A color conversion sheet was prepared in the same manner as in Example 1, except that a resin prepared by adding 20 parts by weight of toluene to 100 parts by weight of an acrylic-based resin (Samwon Co., Ltd, AT-2100) instead of the silicon-based resin of the adhesive layer composition and adding 2 parts by weight of a fluorine-based additive (3M, FC4430) was used.

Example 4

The green organic phosphor solution and the red organic phosphor solution prepared in Example 1 were separately mixed with a polyester resin in which a polyester chip (SK Chemicals, Es-120) was dissolved in methyl ethyl ketone. Thereafter, methyl ethyl ketone was added to each mixture so that the viscosity became 150 cps, and then the mixtures were stirred at 150 rpm for 30 minutes to prepare a green wavelength conversion layer composition and a red wavelength conversion layer composition.

At this time, the green organic phosphor was set to be 0.36 parts by weight based on 100 parts by weight of the solid content of the polyester resin, and the red organic phosphor was set to 0.03 parts by weight based on 100 parts by weight of the solid content of the polyester resin.

Next, the green wavelength conversion layer composition was bar-coated onto the opposite surface of a diffusion layer of a diffusion film (TAK, TDF12C) and dried at 120° C. for 2 minutes to prepare a green wavelength conversion layer having a thickness of 20 μm. The red wavelength conversion layer composition was bar-coated onto an upper surface of a PET film (TAK, PL8), and then dried at 120° C. for 2 minutes to prepare a red wavelength conversion layer having a thickness of 20 μm.

Thereafter, the adhesive layer composition of Example 1 was bar-coated onto an upper surface of the red wavelength conversion layer, and then dried at 120° C. for 2 minutes to prepare an adhesive layer having a thickness of 10 μm. Afterwards, the adhesive layer and the green wavelength conversion layer were laminated so that the upper surface of the adhesive layer was in contact with an upper surface of the green wavelength conversion layer, and then a color conversion sheet was prepared using a roll laminator (GMP, EXCELAM II-355Q).

Comparative Example 1

A color conversion sheet was prepared in the same manner as in Example 1, except that the process of forming the adhesive layer was omitted.

Comparative Example 2

A color conversion sheet was prepared in the same manner as in Example 1, except that a polyester resin in which a polyester (TOYOBO, Vylon630) was dissolved in methyl ethyl ketone was used instead of the silicon-based resin of the adhesive layer composition.

Comparative Example 3

A color conversion sheet was prepared in the same manner as in Example 1, except that a polyester resin in which an acrylic-based resin (Samwon Co., Ltd, AT-2100) was mixed with toluene was used instead of the silicon-based resin of the adhesive layer composition.

Comparative Example 4

A color conversion sheet was prepared in the same manner as in Example 4, except that a polyester resin in which a polyester (TOYOBO, Vylon630) was dissolved in methyl ethyl ketone was used instead of a silicon-based resin of the adhesive layer composition.

For Examples 1 to 4 and Comparative Examples 1 to 4 prepared as described above, physical properties of the film were measured and evaluated according to the following Experimental Example.

Experimental Example (1) Measurement of Surface Energy

In order to measure a difference in surface energy between the wavelength conversion layer and the adhesive layer in the color conversion sheets of Examples 1 to 4 and Comparative Examples 2 to 4, a surface contact angle of each of the wavelength conversion layer and the adhesive layer with each of water ($H_2O$) as a hydrophilic solvent and diiodomethane ($CH_2I_2$) as a hydrophobic solvent was measured using a contact angle meter (Hucom System Co., Ltd, Theta auto) before laminating the wavelength conversion layer and the adhesive layer, and then the surface energy (mN/m) of each layer was calculated through the Young-Dupre equation to measure the difference in surface energy.

(2) Measurement of Luminance and Color Coordinate Change

After measuring the initial luminance (L) and color coordinates (x, y) values of the color conversion sheets of Examples 1 to 4 and Comparative Examples 1 to 4, the color coordinate change ($\Delta x$, $\Delta y$) and luminance change ($\Delta Lv$) over time under the condition of 60° C. were measured using a spectroradiometer (KONICA MINOLTA, CA-520W).

At this time, the color conversion sheet was laminated on an upper surface of the light guide plate of the backlight unit including a blue LED with 450 nm wavelength and the light guide plate, a prism sheet was additionally laminated on an upper surface of the color conversion sheet, and then the experiment was conducted.

(3) Measurement of Adhesion Strength Between Adhesive Layer and Wavelength Conversion Layer In order to measure the adhesion strength between the adhesive layer and the wavelength conversion layer in the color conversion sheets of Examples 1 to 4 and Comparative Examples 2 to 4, one surface of the PET film laminated on the color conversion sheet was attached and fixed to an SUS plate, and then the diffusion film laminated on the color conversion sheet was peeled at 90 degrees from PET at a peel rate of 300 mm/minute at 25° C. using a tensile tester (LLOYD, L/F Plus), thereby measuring the adhesion strength.

Below is a table showing the results of three experiments performed on the color conversion sheet according to the above-described Experimental Example.

Table 1 show shows the results of measuring the difference in surface energy between the wavelength conversion layer and the adhesive layer for Examples 1 to 4 and Comparative Examples 2 to 4. Comparative Example 1 had the adhesive layer omitted and is excluded from the measurement results in Table 1.

TABLE 1

| | Example 1 | Example 2 | Example 3 | Example 4 | Comparative Example 2 | Comparative Example 3 | Comparative Example 4 |
|---|---|---|---|---|---|---|---|
| Difference in surface energy (mN/m) | 21 | 12 | 15 | 21 | 2 | 4 | 2 |

As shown in Table 1, in Examples 1 to 4 in which the adhesive layer was formed with a resin having a hydrophobic functional group or an adhesive layer was formed by adding a separate hydrophobic additive, the difference in surface energy according to Equation 1 was 12 mN/m or more, satisfying the condition of 5 mN/m, which is the condition of Equation 1.

On the contrary, in Comparative Examples 2 to 4 in which the resin having a hydrophobic functional group and the hydrophobic additive were omitted, the difference in surface energy according to Equation 1 was less than 5 mN/m, and thus the condition of Equation 1 was not satisfied. As such, it can be seen that as the adhesive layer contains the resin having a hydrophobic functional group or the hydrophobic additive, the surface energy thereof becomes lower than that of the wavelength conversion layer.

Table 2 shows the results of measuring the luminance and the color coordinate change of Examples 1 to 4 and Comparative Examples 1 to 4.

TABLE 2

| | | High temperature treatment time | | |
|---|---|---|---|---|
| | | 0 Hr | 240 Hr | 480 Hr |
| Example 1 | $\Delta L$(measured value/initial value) | 100% | 102.1% | 101.6% |
| | $\Delta x$, $\Delta y$(measured value-initial value) | 0, 0 | −0.0008, +0.0003 | −0.0010, −0.0001 |

TABLE 2-continued

|  |  | High temperature treatment time | | |
|---|---|---|---|---|
|  |  | 0 Hr | 240 Hr | 480 Hr |
| Example 2 | ΔL(measured value/initial value) | 100% | 102.5% | 103.1% |
|  | Δx, Δy(measured value-initial value) | 0, 0 | −0.0010, +0.0006 | −0.0015, +0.0010 |
| Example 3 | ΔL(measured value/initial value) | 100% | 102.5% | 102.9% |
|  | Δx, Δy(measured value-initial value) | 0, 0 | −0.0009, +0.0005 | −0.0013, +0.0008 |
| Example 4 | ΔL(measured value/initial value) | 100% | 101.1% | 101.4% |
|  | Δx, Δy (measured value-initial value) | 0, 0 | −0.0005, −0.0002 | −0.0008, −0.0004 |
| Comparative Example 1 | ΔL(measured value/initial value) | 100% | 94.6% | 90.3% |
|  | Δx, Δy (measured value-initial value) | 0, 0 | −0.0035, −0.0042 | −0.0053, −0.0065 |
| Comparative Example 2 | ΔL(measured value/initial value) | 100% | 104.3% | 107.6% |
|  | Δx, Δy (measured value-initial value) | 0, 0 | −0.0018, +0.0025 | −0.0031, +0.0042 |
| Comparative Example 3 | ΔL(measured value/initial value) | 100% | 104.2% | 107.7% |
|  | Δx, Δy (measured value-initial value) | 0, 0 | −0.0022, +0.0024 | −0.0036, +0.0044 |
| Comparative Example 4 | ΔL(measured value/initial value) | 100% | 104.2% | 106.4% |
|  | Δx, Δy (measured value-initial value) | 0, 0 | −0.0015, +0.0019 | −0.0022, +0.0035 |

As shown in Table 2, the absolute values (after 240 hours of treatment) of the measured values of the color coordinate changes of Examples 1 to 4 in which the surface energy of the adhesive layer and the wavelength conversion layer satisfied Equation 1 were measured to be 0.0010 or less on both x-axis and y-axis. On the contrary, Comparative Example 1, which is a color conversion sheet in which an adhesive layer was not formed and thus the wavelength conversion layer was exposed to the outside, exhibited the largest x-axis change value of −0.0035 and the largest y-axis change value of −0.0042 among all Examples and Comparative Examples. In addition, Comparative Examples 2 to 4, in which the resin having a hydrophobic functional group and the hydrophobic additive were omitted, exhibited a greater color coordinate change compared to Examples 1 to 4. That is, it was confirmed that in Comparative Examples in which the surface energy of the wavelength conversion layer and the adhesive layer did not satisfy Equation 1, the color coordinate change was greater than those of Examples 1 to 4 in which the surface energy of the wavelength conversion layer and the adhesive layer satisfied Equation 1.

In addition, Examples 1 to 4 exhibited a luminance change of less than 3.1% after 480 hours treatment at 60° C., whereas Comparative Example 1, which is a color conversion sheet in which an adhesive layer was not formed and hence the wavelength conversion layer was exposed to the outside exhibited a luminance change of 9.7%, and Comparative Examples 2 to 4 in which the resin having a hydrophobic functional group and the hydrophobic additive were omitted exhibited a luminance change of 6.4 to 7.7%.

As described above, it was confirmed that in the case of the color conversion sheet in which the wavelength conversion layer is exposed to the outside as in Comparative Example 1 and the case where the adhesive layer having a low difference in surface energy with respect to the wavelength conversion layer was contained as in Comparative Examples 2 to 4, considerable color change and luminance change occurred in a high temperature environment. On the contrary, it was confirmed that in the case where the adhesive layer having a high difference in surface energy with respect to the wavelength conversion layer was included, color and luminance change was small even in a high temperature environment.

Table 3 shows the results of measuring adhesion strength between the adhesive layer and the wavelength conversion layer of Examples 1 to 4 and Comparative Examples 2 to 4. Comparative Example 1 had the adhesive layer omitted and thus was excluded from the experiment.

TABLE 3

|  | Example 1 | Example 2 | Example 3 | Example 4 | Comparative Example 2 | Comparative Example 3 | Comparative Example 4 |
|---|---|---|---|---|---|---|---|
| Peeled surface | Interface between wavelenth conversion layer and adhesive layer | Interface between wavelength conversion layer and adhesive layer | Interface between wavelength conversion layer and adhesive layer | Interface between green wavelength conversion layer and adhesive layer | Interface between wavelength conversion layer and adhesive layer | Interface between wavelength conversion layer and adhesive layer | Interface between wavelength conversion layer and adhesive layer |
| Adhesion strength (gf/inch) | 420 | 391 | 364 | 432 | 164 | 592 | 168 |

As shown in Table 3, it was confirmed that the color conversion sheets of Examples 1 to 3 in which the surface energy of the adhesive layer and the wavelength conversion layer satisfied Equation 1 had an adhesion strength of 50 gf/inch or more between the wavelength conversion layer and the adhesive layer. If the adhesion strength of the adhesive layer is less than 50 gf/inch, it may be difficult to fix the laminated structure of the color conversion sheet, so the adhesion strength of the adhesive layer needs to be 50 gf/inch or more.

The color conversion sheet according to the present invention as described above is further provided with an adhesive layer that prevents the diffusion of the organic phosphor, so that the problems, such as color coordinate change or degradation in reliability, which may occur when the wavelength conversion layer is exposed to the outside and thus an organic phosphor in the wavelength conversion layer is deteriorated by unnecessary elements, such as moisture and oxygen in the air, may be solved. In addition, the organic phosphors in the wavelength conversion layer are prevented from being diffused into the adhesive layer under the condition of high temperature, or high temperature and high humidity, by using a difference in surface energy between the wavelength conversion layer and the adhesive layer, thereby solving problems of change in luminance characteristics and color change.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A color conversion sheet comprising:
   a first wavelength conversion layer in which an organic phosphor is dispersed in a resin matrix; and
   an adhesive layer disposed on one surface of the first wavelength conversion layer, in which a surface energy of the first wavelength conversion layer is different from a surface energy of the adhesive layer so that the organic phosphor does not diffuse into the adhesive layer.

2. The color conversion sheet of claim 1, further comprising a base film may be further included on at least one surface of the first wavelength conversion layer or the adhesive layer.

3. The color conversion sheet of claim 1, wherein a difference between the surface energy of the first wavelength conversion layer and the surface energy of the adhesive layer exceeds 5 mN/m.

4. The color conversion sheet of claim 1, wherein, in the first wavelength conversion layer, organic phosphors of the same color or two or more different colors are dispersed in the resin matrix.

5. The color conversion sheet of claim 1, wherein the resin matrix contains at least one of an ester-based resin, an olefin-based resin, an acrylic-based resin, an ether-based resin, an urethane-based resin, a carbonate-based resin, or an imide-based resin.

6. The color conversion sheet of claim 1, wherein a resin contained in the resin matrix has a number average molecular weight (Mn) of 1,000 to 50,000 g/mol or a weight average molecular weight (Mw) of 50,000 to 2,000,000 g/mol.

7. The color conversion sheet of claim 1, wherein the resin matrix has a glass transition temperature of 0 to 120° C.

8. The color conversion sheet of claim 1, wherein the adhesive layer contains a resin having a hydrophobic functional group.

9. The color conversion sheet of claim 1, wherein the adhesive layer contains a resin, such as a thermoplastic resin, a thermosetting resin, or a UV curable resin and a hydrophobic additive, having a visible light transmittance of 70% or more.

10. The color conversion sheet of claim 1, wherein the adhesive layer contains a resin having a hydrophobic functional group, and a hydrophobic additive.

11. The color conversion sheet of claim 10, wherein the resin having a hydrophobic functional group or the hydrophobic additive contain at least one of single molecules, oligomers, or resins, including a silicon or fluorine element.

12. The color conversion sheet of claim 2, wherein an adhesion strength of the adhesive layer to the first wavelength conversion layer or the base film is 50 gf/inch or more.

13. The color conversion sheet of claim 1, wherein the organic phosphor is contained in an amount of 0.0001 to 10 parts by weight based on 100 parts by weight of resin solid content of the resin matrix.

14. The color conversion sheet of claim 1, further comprising a second wavelength conversion layer formed on one surface of the adhesive layer on which the first wavelength conversion layer is not positioned.

15. The color conversion sheet of claim 14, wherein the second wavelength conversion layer contains an organic phosphor of the same or different color from that of the organic phosphor contained in the first wavelength conversion layer.

16. A backlight unit comprising the color conversion sheet according to claim 1.

* * * * *